United States Patent [19]

Kelly et al.

[11] 3,844,038
[45] Oct. 29, 1974

[54] SHEET VINYL WALL TRIMMER TOOL

[75] Inventors: Edward G. Kelly, Allentown; Theodore E. Dean, Coplay, both of Pa.; Frederick S. Tuttle, Toms River, N.J.

[73] Assignee: GAF Corporation, New York, N.Y.

[22] Filed: Dec. 11, 1972

[21] Appl. No.: 313,691

[52] U.S. Cl. .................................. 30/293, 30/314
[51] Int. Cl. ............................................. B26b 3/08
[58] Field of Search ............ 30/286, 289, 290, 314, 30/320, 294, 287, 292, 293; 33/41 R

[56] References Cited
UNITED STATES PATENTS

| | | | |
|---|---|---|---|
| 2,007,396 | 7/1935 | Howard | 30/292 |
| 2,065,761 | 12/1936 | Smith | 30/289 X |
| 3,482,310 | 12/1969 | Paterson | 30/314 X |
| 3,504,435 | 4/1970 | Sloboda et al. | 30/294 X |
| 3,581,397 | 6/1971 | Kochanowski | 30/293 |
| 3,772,785 | 11/1973 | Fischer | 30/293 |

FOREIGN PATENTS OR APPLICATIONS 1,190,125  3/1959  France .................................. 30/292

Primary Examiner—Othell M. Simpson
Assistant Examiner—Marc R. Davidson
Attorney, Agent, or Firm—Walter C. Kehm; Samson B. Leavitt

[57] ABSTRACT

A hand held cutting tool particularly suitable for use with flexible flooring sheet material. The tool includes a frame having a cutting blade adjustable with respect to the frame. A pair of balls positioned in the frame bearing upon the material to be cut defines a radius of curvature to which the material being cut is conformed during operation of the cutting tool. An array of rotatable members such as balls form part of a support structure which permits the frame to be suitably supported as well as to be adjusted to vary the angle of the frame and cutting blade with respect to the floor. Suitable graduations are provided for controlling incremental movement of the frame, as well as the cutting blade.

7 Claims, 6 Drawing Figures

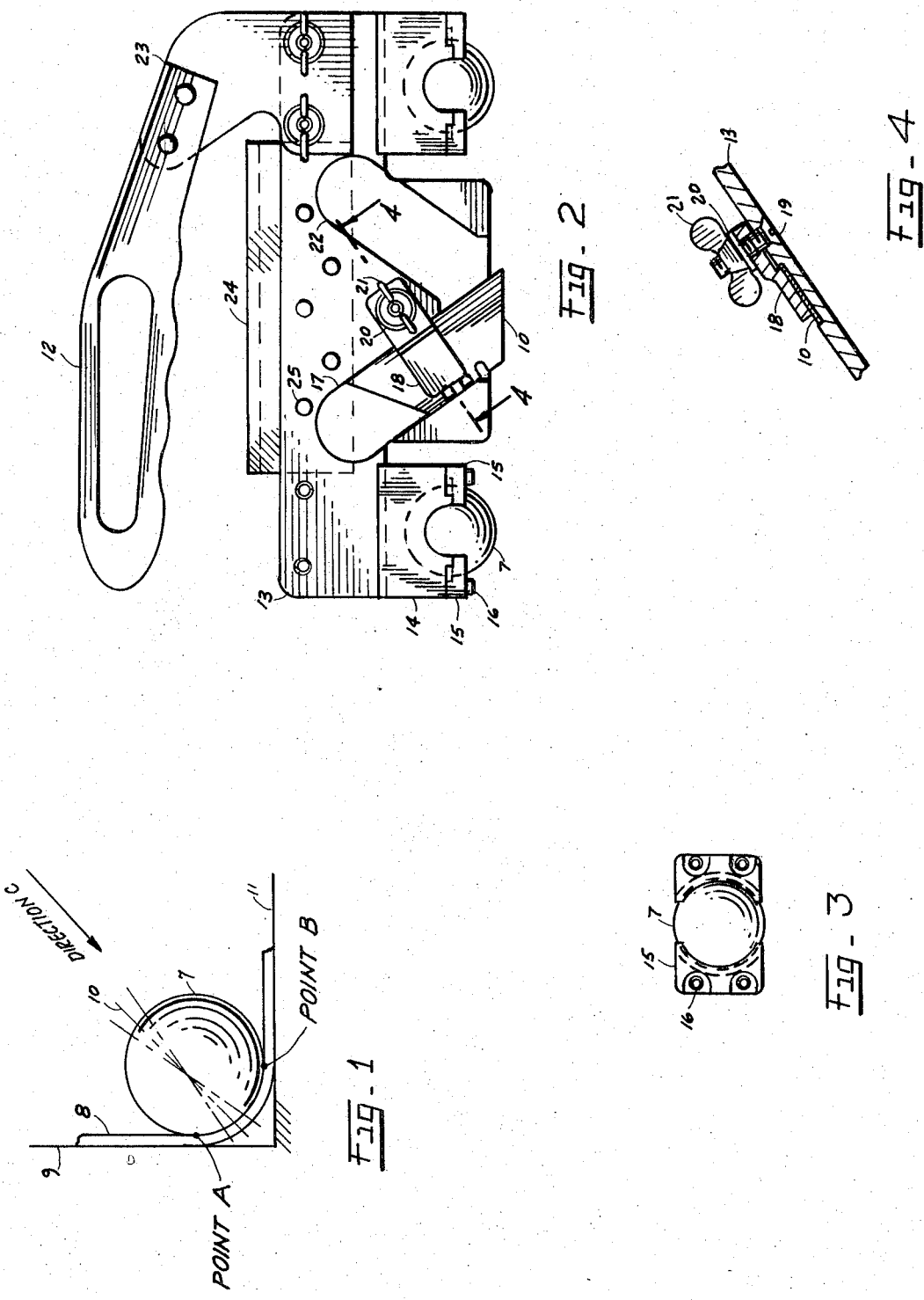

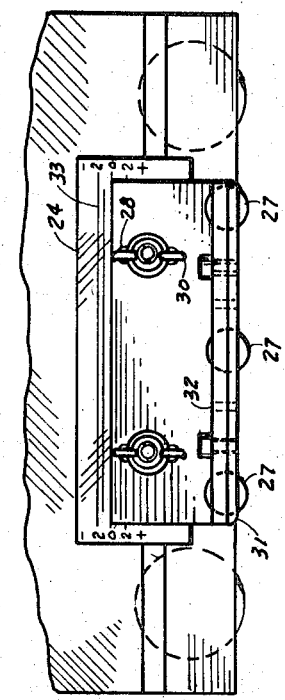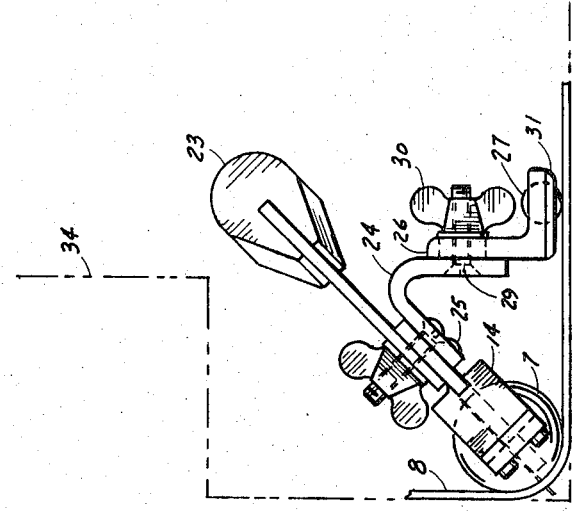

SHEET VINYL WALL TRIMMER TOOL

The present invention is directed to a new novel installation and trimming tool suitable for use on flexible sheet or web such as vinyl sheet flooring. More particularly, the present invention is directed to a hand held apparatus requiring a bearing force to be applied at a prescribed angle against the material to be cut.

Up until the present invention, vinyl sheet flooring material has been cut and trimmed manually by highly skilled mechanics or craftsmen using suitable knives of different types. Without much question, the quality of the mechanics work was almost directly related to the amount of skill he employed. For an example, sheet vinyl material would be trimmed manually by drawing a suitable knife over such flooring material after pressing such material against the wall, with the result being severed material. The point of entry of the blade of the knife coupled with the radius of the flooring formed by such flooring against the wall, determined where the sheet of flooring would lie after it has been cut. In order to carry out the above, it was obligatory that a person with a high degree of skill be employed in performing such an operation. It follows without such an artisan, the result on the finished flooring will be less than satisfactory. Some of the more common faults heretofore present were: generally inferior cuts, loss of time, loss of material, and high costs.

For some time now, there has been a shortage of skilled technicians and tradesmen adapted to install flooring materials. Because the shortage is so acute, it often takes several weeks time before a skilled serviceman can be obtained to perform a given job. With this in mind, it obviously would be most desirable to employ unskilled labor or semi-skilled labor and yet avert the aforementioned difficulties. To satisfactorily achieve this, proper technician training, as well as suitable tools are required. Once the above is satisfied, it would then be possible for the skilled technician to undertake the more difficult jobs during the installation operation, such as trimming around fixtures or other standing objects with the eventual result that the overall cost and time expanded in the installation operation would be substantially lessened.

At the moment, there are installation tools on the market intended to perform in this area but which function and are structurally different from the instant invention. For an example, there is one tool available which includes an aluminum extrusion with a special blade for cutting carpet, where the blade is adjustable for a depth of cut but the blade angle which determines the angle of penetration of the material to be cut is fixed. This unit has been examined by Applicants and has been found to be of limited application, especially suitable for foam-backed carpeting material. Another type of unit which has been examined is very costly and is particularly suitable for all types of carpeting installation. However, the ability of this unit to slide smoothly on sheet vinyl has been found less than desirable. Still another unit that has been studied by Applicants has been found to lack any means for smooth and efficient movement along the material to be cut. Therefore, these units are difficult to push over the flooring due to the high co-efficient of friction which results upon contacting such flooring material. Furthermore, this tool uses expensive and not readily available blades for cutting and has exhibited extreme difficulty in obtaining a high level of control for accuracy of cut.

It has been discovered that when using the instant invention an unskilled worker can make repeated high quality cuts without the proficiency formerly required. This enables the skilled craftsman to devote more time to trimming around the areas of fixtures, etc. which require a great deal more dexterity and judgment. Furthermore, the instant invention assures an accuracy which enables contouring any slight discrepancies and irregularities in the base wall surface and provides a constantly parallel cut to the wall being fitted.

By means of the present invention, it is contemplated that the craftsman doing the cutting can adjust the angle of cut and determine the spacing between the sheet and the wall. This in turn will determine the type of installation employed, for example, for flooring products that are applied by adhesive, only a relatively small distance to the wall is required, whereas approximately 1/8 inch clearance is necessary for a loose laid type of job, to permit expansion of the flooring.

It also has been discovered by use of the present invention that since the angle of cut is fixed in advance, there is no need for the operator to concentrate on the cutting angle and hence a faster cut is realized. At the same time, the depth of cut is adjustable so as to accommodate various thicknesses of material being cut.

Collateral advantages associated with the present invention relate to the ability of obtaining superior cuts coupled with a high degree of accuracy and a higher degree of utilization of the material being installed, with a consequent minimization of waste due to carelessnes and improper trimming. Up to the present time, this has been a major problem.

In addition, because of the unique features of the present invention, it is adaptable for being reversed and is therefore suitable for either left hand or right hand craftsmen with an equal degree of accuracy and control over the cutting operation. The tool of the instant invention is provided with a graduated scale for ready reference; this will permit the operator to return to previous settings and continue with cuts especially when switching from "loose lay" to "net fit" arrangements.

An essential feature of the instant invention concerns itself with ball rollers which rotate freely in any direction and are therefore able to add to the convenience of the operator insofar as resistance between the tool and the material being cut is concerned. It follows that operator fatigue is minimized and it is possible to obtain a higher level of performance and production from the craftsman for a given quantity of material under the same conditions of time as in the past.

Accordingly, it is the main object of the present invention to provide a sheet vinyl wall trimmer tool free of the defects of all of the prior art.

Still another object of the present invention is to provide a relatively inexpensive vinyl trimming tool suitable for use by semi-skilled laborers for installation of vinyl sheet material.

Still another object of the present invention is to provide a readily adjustable vinyl hand trimming tool which enables a high degree of control over the cutting operation when such tool is utilized on vinyl sheet material.

With the foregoing and other objects in view, there is provided in accordance with the invention an apparatus for use with a flexible sheet of flooring material including: frame means; a plurality of spaced, rotatable guide means disposed in said frame means and rotatable therein; cutting blade means intermediate said guide means; cutting blade positioning means, said cutting blade positioning means including cutting blade guide means for positioning said cutting blade means with respect to said frame means; and frame support means, including adjustable means for adjusting the angle of said frame means and cutting blade means with respect to a surface (such as the floor upon which the flooring material is being laid) upon which the apparatus is positioned for operation.

The construction and operation of the invention, however, together with additional objects and advantages will be best understood from the following description of specific embodiments when read in connection with the figures of the accompanying drawings showing the apparatus in accordance with the invention.

FIG. 1 is a diagrammatic representation depicting the angular location of the ball in relation to the material to be cut and the wall.

FIG. 2 is an elevational view of the embodiment of the instant invention.

FIG. 3 is an auxillary view of FIG. 2 illustrating the ball and socket arrangement.

FIG. 4 is an auxillary view of FIG. 2 illustrating the knife blade and clamping apparatus.

FIG. 5 is a side view of the invention illustrating the support rollers.

FIG. 6 is a partial elevational view illustrating the relationship of the sphere housing 26 and bracket 24.

As shown FIG. 1, the flexible web 8 is engaged between the ball 7 and wall 9 along a radius extending from points A to B. The radius is fixed in accordance with the ball 7 diameter and may be varied accordingly. By fixing the radius of the web 8, it is then possible to permit the knife blade 10 to penetrate such web 8 at a pre-determined point as the blade is thrust in the direction C. By varying the angle of the blade 10 with respect to floor 11 the angle of penetration is varied and there is corresponding gap created between the finished cut and the wall 9. Such gap forms the clearance between the flooring 11 and the wall 9 and, depending upon the method of application, can be varied.

According to FIG. 2 the trimmer tool 12 includes a frame 13 having a pair of balls 7 disposed at each respective end. Such balls 7 are mounted in socket 14 which is integral with frame 13 and are held in place by cap 15. The cap 15 in turn is fixedly attached to the socket 14 by screws 16 in order to retain the ball 7 in place. Suitable clearance is provided to enable the ball 7 to rotate freely in the socket 14. Blade 10 is positioned in a recessed slot 17 on frame 13 intermediate the two sockets 14. A clamp 18 is fastened to frame 13 by a suitable fastener, such as a machine screw 19 having a flat washer 20 thereon, as well as a thumb unit 21. This arrangement clamps blade 10 at a desired position along slot 17 with respect to the flexible web 8. By varying the position of blade 10 downward, it is possible to extend the blade 10 below the frame surface to thereby cut increasingly thicker materials. The recessed slot 17 additionally supports the blade 10 during cutting by providing opposing wall abuttment. A second slot 22 located proximate to slot 17 allows the blade 10 to be reversed for cutting in the reverse direction, thus eneabling left hand, as well as right hand usage. Clamp 18 is adapted to rotate and can affix the blade 10 in slot 22, thereafter functioning in a similar manner as mentioned above. A handle 23 is affixed to the flame 13 by suitable fasteners and can be moved from the left hand to right hand usage position. A bracket 24 fastened to frame 13 by rivets 25 or other suitable means, provides a surface on to which sphere housing 26 is affixed. This housing receives spheres 27 which are intended to support the frame 13 at a preset angle. By adjusting the sphere housing 26, it is possible to alter the angle of the frame 13 and in turn change the angle of the blade 10. This relationship is quite important since the angle of cut can be thusly varied. The sphere housing 26 also provides support for frame 13. A slot 28 in sphere housing 26 receives a fastener such as a machine screw 29 and thumb nut 30 for positioning sphere housing 26 with respect to frame 13. The spheres 27 are a multidirectional support means for the entire assembly and can be placed in an array, for example, three or more in number. The spheres 27 are disposed between housing 26 and cap 31 and are provided with sufficient clearance to provide free rotation. The cap 31 is positioned by dowel pins 32 in respect to housing 26 and clamped thereto. Bracket 24 includes scribed lines 33 which form a graduated reference scale to allow the operator to return to previous reference settings which are marked.

As shown in FIG. 5, the profile of the assembly is intended to slope in a manner sufficient to clear the normal "toe--kick" to be found at certain installation applications.

During operation, the tool 12 is urged toward direction C with the blade 10 extending in accordance with desired depth of cut. As the flexible web 8 is entrapped between ball 7 and wall 9 the knife 10 pierces the web 8. As a bearing force provided by the operator is applied in direction C the tool 12 is drawn in the direction of cut, the web 8 is continuously severed along the wall 9. The multidirectional balls 7 and spheres 27 are always moving in accordance with the forces applied, thereby eliminating any tendency for such spheres to move out of the intended line of travel. This arrangement permits a high degree of accuracy and control over the cut. A by-product of this condition is that the tool does not have to overcome additional frictional forces that normally would be present if such balls and spheres were to move in only one direction. The balls 7 and spheres 27 are selected of materials such as nylon, to provide self lubricating properties enabling smooth rolling action.

While the invention has been disclosed in conjunction with certain particular embodiments, it is not confined to the details of construction herein set forth, and this application is intended to cover such departures or modified arrangements as may come within the purposes of the improvements or the scope of the following claims.

What we claim is:

1. An apparatus for trimming flexible sheet of flooring material including:
   frame means;
   a plurality of spaced, rotatable guide means disposed in said frame means to move along a cutting line;

cutting blade means intermediate and substantially in alignment with said guide means for cutting along said line;
cutting blade positioning means, said cutting blade positioning means including blade guide means for positioning said cutting blade means with respect to said frame means; and
frame support means, including adjustable means for adjusting the angle of said frame means and said cutting blade means with respect to a surface upon which the apparatus is positioned for operation.

2. An apparatus as claimed in claim 1 including further blade guide means for alternately positioning said cutting blade means in a direction opposite to the previous position of said cutting blade means.

3. An apparatus as claimed in claim 1 including: a handle means removably attached to said frame means and contoured to fit conveniently within the grasp of an operator.

4. An apparatus as claimed in claim 1 wherein: said frame support means is adjustable with respect to said frame means.

5. An apparatus as claimed in claim 1 wherein: said frame support means includes an array of spherical bodies rotatably positioned therein.

6. An apparatus as claimed in claim 1 wherein: said frame means includes a graduated scale means for ascertaining the relative angle of said cutting blade means with respect to said surface.

7. An apparatus as claimed in claim 1 wherein said guide means disposed in said frame means includes a plurality of spaced balls having radii for defining a radius of curvature which the flooring material is caused to assume during operation of the apparatus.

* * * * *